US012670614B2

(12) United States Patent  
Uberti et al.

(10) Patent No.: US 12,670,614 B2  
(45) Date of Patent: Jun. 30, 2026

(54) SYSTEM AND METHOD OF SIMULTANEOUS LOCALISATION AND MAPPING

(71) Applicant: Sony Interactive Entertainment Inc., Tokyo (JP)

(72) Inventors: David Erwan Damien Uberti, London (GB); Mark Jacobus Breugelmans, London (GB); Calum Armstrong, London (GB); Maurizio Cerrato, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 656 days.

(21) Appl. No.: 17/965,021

(22) Filed: Oct. 13, 2022

(65) Prior Publication Data

US 2023/0117567 A1 Apr. 20, 2023

(30) Foreign Application Priority Data

Oct. 20, 2021 (GB) ..................................... 2115001

(51) Int. Cl.  
*G06T 7/73* (2017.01)  
*G06V 10/764* (2022.01)  
(52) U.S. Cl.  
CPC .............. *G06T 7/74* (2017.01); *G06V 10/764* (2022.01); *G06T 2207/30244* (2013.01)  
(58) Field of Classification Search  
USPC ......................................................... 382/103  
See application file for complete search history.

(56) References Cited

U.S. PATENT DOCUMENTS

| | | | | |
|---|---|---|---|---|
| 10,482,674 B1 * | 11/2019 | Wu | .......................... | G09B 25/00 |
| 2018/0276891 A1 * | 9/2018 | Craner | ..................... | G08B 7/06 |
| 2018/0348783 A1 * | 12/2018 | Pitzer | ................... | G05D 1/0214 |
| 2019/0089930 A1 * | 3/2019 | Hashimoto | ........... | G06F 3/0346 |
| 2019/0362557 A1 * | 11/2019 | Lacey | ..................... | G06F 3/012 |
| 2020/0019781 A1 * | 1/2020 | Smith | ..................... | G06F 3/012 |
| 2020/0065584 A1 | 2/2020 | Iyer | | |
| 2021/0233314 A1 * | 7/2021 | Johnson | ............. | G02B 27/0172 |
| 2021/0304514 A1 | 9/2021 | Croxford | | |
| 2021/0335049 A1 * | 10/2021 | Miller | ....................... | G06T 7/73 |
| 2024/0012491 A1 * | 1/2024 | Torres | ................... | G06T 19/003 |

OTHER PUBLICATIONS

Extended European Search Report for corresponding EP Application No. 22201110.8, 9 pages, dated Mar. 16, 2023.  
Combined Search and Examination Report for corresponding GB Application No. 2115001.6, 12 pages, dated Jul. 4, 2022.

* cited by examiner

*Primary Examiner* — Andrae S Allison  
(74) *Attorney, Agent, or Firm* — Kilpatrick Townsend & Stockton LLP

(57) ABSTRACT

A method of environment mapping includes the steps of receiving a plurality of images from respective different viewpoints; using a simultaneous localisation and mapping 'SLAM' process, detect feature points in the plurality of images; classifying one or more objects within the plurality of images as being objects of interest; determining the position of the or each object of interest using feature points corresponding to the objects of interest in the images; and providing an indication of the position of one or more objects of interest to a user of a virtual display; and where the step of determining the position of the or each object of interest using their feature points is repeated, more frequently than for other feature points in the images.

20 Claims, 6 Drawing Sheets

432 — Estimate camera pose

434 — Project landmark into image

436 — Search for image features

438 — Update pose

412 — Capture images

414 — Generate map

SYSTEM AND METHOD OF SIMULTANEOUS LOCALISATION AND MAPPING

BACKGROUND OF THE INVENTION

Field of the Invention

The present invention relates to a system and method of simultaneous localisation and mapping.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

In some computer vision applications, there is a requirement to be able to process the 3D position of image features captured by a 2D camera. One example situation is found in robotics, in that a robot using computer vision may need to be able to map its environment and also know its own location with respect to that environment. Another example situation occurs in videogames, in that, for example, a hand-held or head-mounted gaming device having a camera built into the device can be used to capture images of the real surroundings, onto which so-called augmented reality (AR) image features can be rendered for display to a user, and/or to enable import of at least part of the real surroundings into a virtual environment. For example, a gaming device may capture an image of a real building, but this is displayed to the user with an animal, superhero or other image rendered so as to be climbing up the side of the building.

In order to integrate real-world features with a virtual environment, augment an image of real world features with virtual elements, and/or use real world features to at least partially configure a virtual environment, the gaming device needs to be able to derive the orientation of the feature (e.g. the side of the building) and an indication of its scale which may be derived as an indication of its relative distance from the camera compared to other captured image features. In order to integrate, augment or use these features while continuously tracking a moving camera, the camera orientation and position for a captured image frame, and typically a constant plane equation for feature surfaces (e.g. an estimate of the surface position), are required.

Whist it is possible to use AR markers to indicate scale and orientation directly (by virtue of a known size and pattern asymmetry), typically it is not practical to add such markers to the real world environment, or to expect a user to know where best to place them.

Consequently techniques have been proposed, generically called "simultaneous localisation and mapping" (SLAM) in which the problems of building a map of a camera's environment and determining the position in space of the camera itself are bound together in a single iterative process. Accordingly, SLAM attempts to build a map or model of an unknown scene and estimate a camera position within that map.

It is an aim of the present application to provide improved localisation, mapping and virtual/augmented reality arrangements.

SUMMARY OF THE INVENTION

Various aspects and features of the present invention are defined in the appended claims and within the text of the accompanying description.

In a first aspect, a method of environment mapping is provided by claim 1.

In another aspect, an environment mapping system is provided by claim 15.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A system and method of simultaneous localisation and mapping are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
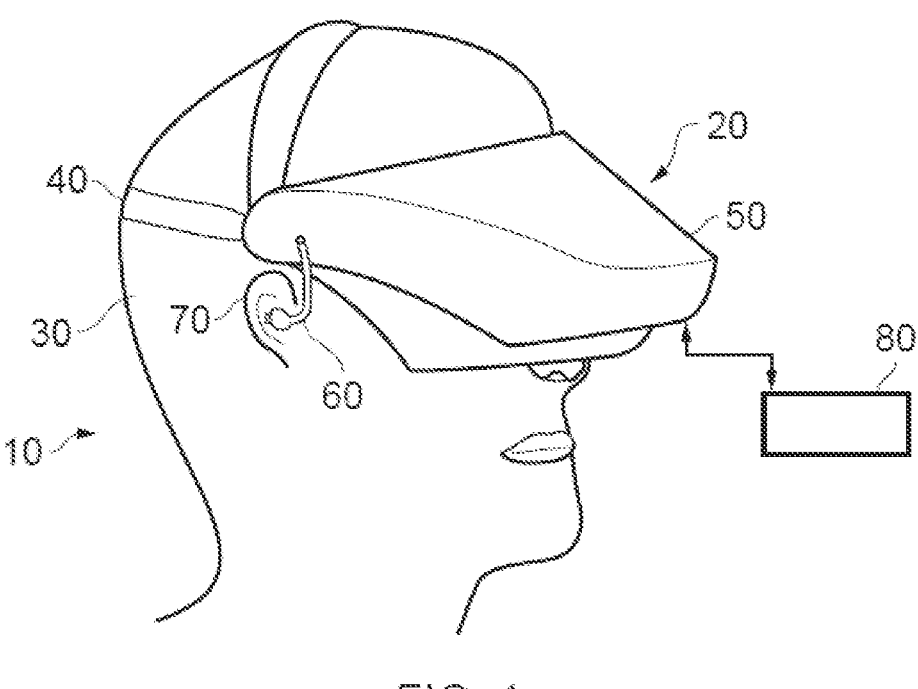
FIG. 1 schematically illustrates a head-mountable display apparatus (HMD) worn by a user.

Referring now to the drawings, wherein like reference numerals designate identical or corresponding parts throughout the several views, FIG. 1 shows a user 10 wearing an head-mountable display apparatus (HMD) 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

One or more image sensors can be provided as part of the HMD (not shown in FIG. 1), such as one or more front-facing cameras arranged to capture one or more images to the front of the HMD. The one or more image sensors can comprise one or more of an RGB image sensor and an infrared (IR) image sensor. Such images may be used for head tracking purposes, in some embodiments, while it may also be suitable for capturing images for an augmented reality (AR) style experience. Such a camera may optionally use a wide angle lens or fish-eye lens to capture a large portion of the real world environment around the HMD A Bluetooth® antenna may provide communication facilities or may simply be arranged as a directional antenna to allow a detection of the direction of a nearby Bluetooth® transmitter.

In operation, a video signal is provided for display by the HMD. This could be provided by an external video signal source 80 such as a video games machine or data processing apparatus (such as a personal computer or the PS5®), in which case the signals could be transmitted to the HMD by a wired or a wireless connection. Examples of suitable wireless connections include Bluetooth® connections and an example of suitable wired connections include High Definition Multimedia Interface (HDMI®) and Display-Port®. Audio signals for the earpieces 60 can be carried by the same connection. Similarly, any control signals passed between the HMD to the video (audio) signal source may be carried by the same connection. Furthermore, a power supply (including one or more batteries and/or being connectable to a mains power outlet) may be linked by a wired connection to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may in some examples be carried by an optical fibre cable. In other embodiments, at least part of the functionality associated with generating image and/or audio signals for presentation to the user may be carried out by circuitry and/or processing forming part of the HMD itself. In some cases, a power supply may be provided as part of the HMD itself.

Some embodiments of the invention are applicable to an HMD having at least one cable linking the HMD to another device, such as a power supply and/or a video (and/or audio) signal source. Hence embodiments of the invention can include, as non-limiting examples:

(a) an HMD having its own power supply (as part of the HMD arrangement) but a wired connection (also referred to as a cabled connection) to a video and/or audio signal source;

(b) an HMD having a wired connection to a power supply and to a video and/or audio signal source, embodied as a single physical cable or more than one physical cable;

(c) an HMD having its own video and/or audio signal source (as part of the HMD arrangement) and a wired connection to a power supply; or (d) an HMD having a wireless connection to a video and/or audio signal source and a wired connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation. Accordingly, the arrangement of FIG. 1 provides an example of a head-mountable display comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment.

The HMD as shown in FIG. 1 thus provides an example of a mobile electronic device comprising one or more image sensors for capturing images of a surrounding environment. Another example may be a mobile phone. When worn or held by a user, the image sensors can thus capture a plurality of images of the surrounding environment from respective different viewpoints and the plurality of images can be used for simultaneous localisation and mapping for the surrounding environment.

Whilst examples of the present disclosure will be described with reference to an HMD, which represents an example of a mobile electronic device, the embodiment of the present disclosure are not limited to an HMD and can be performed for any mobile electronic device comprising one or more images sensors, of which examples include: handheld devices (e.g. a smartphone), robotic devices and autonomous cars. For example, as a robotic device navigates a surrounding environment, one or more image sensors mounted on the robotic device can capture a plurality of images of the surrounding environment from respective different viewpoints and the captured images can be used for simultaneous localisation and mapping for the surrounding environment.

Before discussing the techniques of the present disclosure, some terminology will be introduced by discussing a conventional tracking and mapping process using images of an environment.

In a tracking and mapping process, images of a scene in three-dimensional space are captured from different viewpoints (different camera poses) using one or more image sensors. Feature points can be detected in the captured images of the scene using known image recognition techniques. For example, for an image comprising an object having several corner points, a corner detection algorithm such as FAST (Features from Accelerated Segment Test) can be used to extract feature points corresponding to the corners of one or more elements in the image, such as a corner of a chair or a corner of a wall. The feature points are thus identified in the plurality of captured images and are associated with one another in the sense that the image position of a particular three-dimensional point as captured in one image is associated with the image position of that three-dimensional point as captured in another image. The basis of a typical tracking and mapping system involves deriving, from this information on associated points in one image with points in another image, an internally consistent set of data defining the respective camera viewpoints and the three-dimensional positions of the points. In order for that set of data to be internally consistent, it should lead to a consistent set of three-dimensional positions, and in respect of a particular image, it should lead to a consistent relationship between the camera pose for that image and the expected (and actual) image positions of points as captured by that image.

Figure 2:
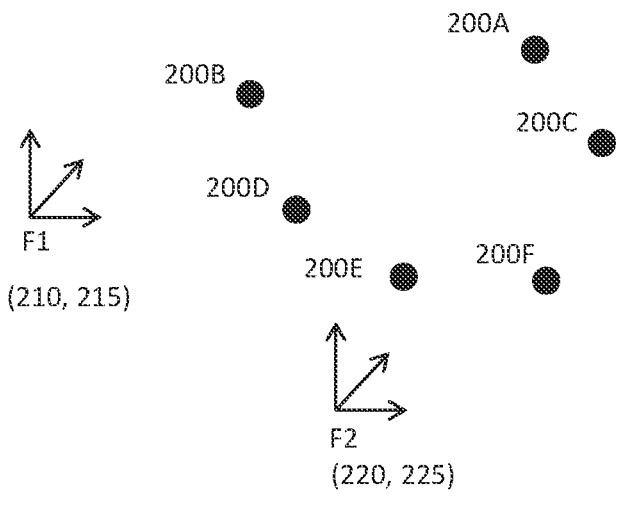
FIG. 2 schematically illustrates an example of a set of detected feature points for an environment.

To illustrate some of these concepts further, FIG. 2 schematically illustrates an example of a set of detected feature points (labelled as numerals 200A . . . 200F) obtained from two respective images captured with two different viewpoints F1, F2 for a scene. Each viewpoint comprises a camera position 210, 220 and a camera orientation 215, 225 relative to a local coordinate frame (illustrated schematically as three orthogonal axes in each case). Although, for practical reasons, FIG. 2 is drawn in two dimensions, the detected feature points each represent a three-dimensional point.

Figure 3A:
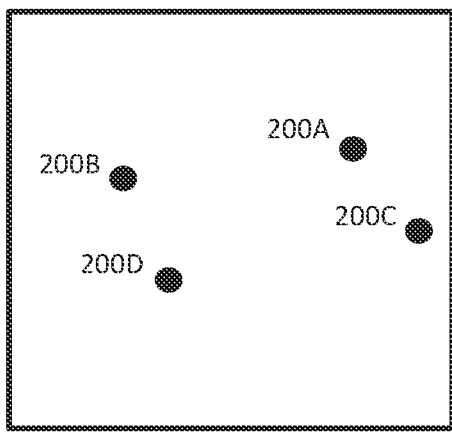
FIGS. 3A and 3B schematically illustrate images captured from the two viewpoints of FIG. 2.
Figure 3B:
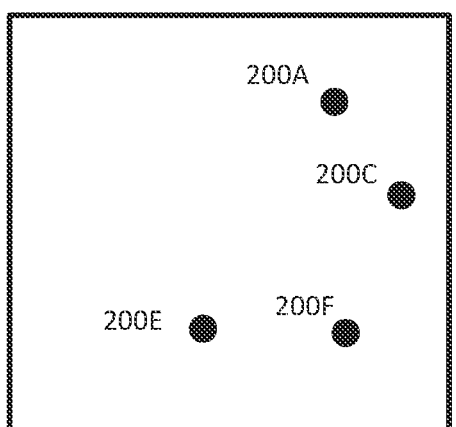

FIGS. 3a and 3b are schematic representations of images captured by the camera at positions F1 and F2. In each case, some of the points 200A . . . 200F can be seen in the captured images. If the set of data discussed above is internally consistent, the actual image positions of these points will correspond to the image positions predicted from the camera pose and the three-dimensional positions derived for those points. Typically the images are captured by the same camera at different positions, but where multiple cameras capture overlapping views and have a known positional relationship to each other then such images can alternatively or in addition be used to the extent that the views overlap.

Figure 4:
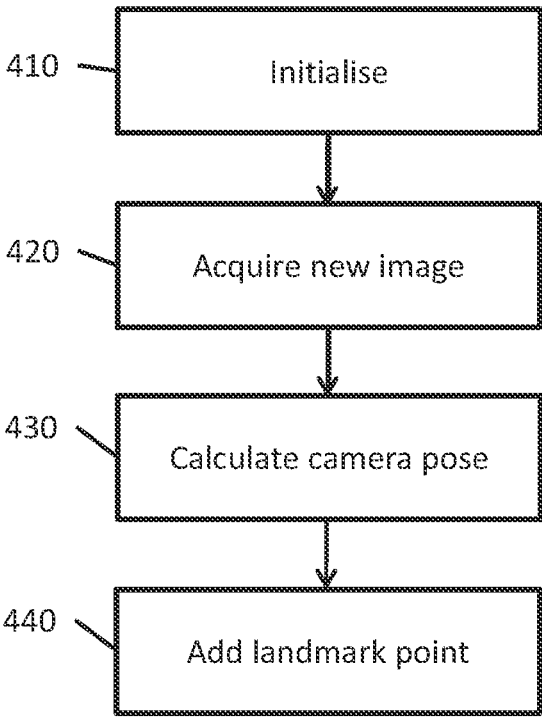
FIG. 4 is a schematic flowchart giving an overview of a tracking and mapping process.

FIG. 4 is a schematic flowchart giving an overview of a tracking and mapping process that can be performed on the basis of a set of detected feature points as shown in FIG. 2. The example process starts from no advanced (a priori) knowledge of either the camera viewpoints or the spatial position of feature points to be captured by the camera images. Accordingly, a first stage is to initialise the system at a step 410. Initialisation will be discussed in more detail below, but typically involves detecting feature points captured for different viewpoints so that a same feature point is detected for two or more different viewpoints, in which each detected feature point corresponds to a landmark point for use in mapping the scene, and deriving a set of map data for the scene using each of the landmark points.

A loop operation then follows, comprising the steps of acquiring a new image (for example, at an image capture rate such as 15 images per second, 30 images per second, 60 images per second or the like) at a step 420, calculating a position and orientation of the viewpoint for the new image from the set of map data and the newly acquired image at a step 430 and, potentially, adding detected feature points from the newly acquired image as further landmark points for updating the map at a step 440. Note that although the step 440 is shown in this example as forming part of the basic loop of operation, the decision as to whether to add further landmark points is optional and could be separate from this basic loop.

Figures 5, 6:
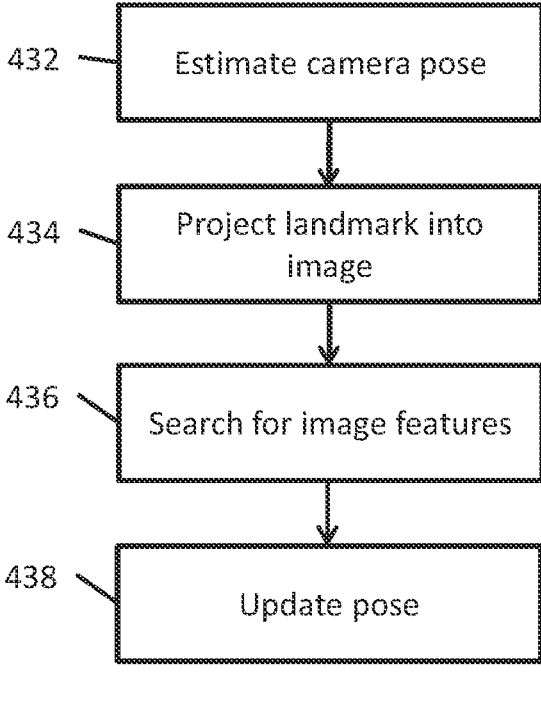
FIG. 5 is a schematic flowchart of a camera pose calculation process.
FIG. 6 is a schematic flowchart of an initialisation technique.

FIG. 5 is a schematic flowchart of operations carried out as part of the step 430 of FIG. 4. These operations are performed to derive a viewpoint position and orientation (also referred to as a camera pose) from a newly acquired image and the set of map data.

At a step 432, the system first estimates a prediction of a camera pose in respect of the newly acquired image. This initial estimation may be performed using a model. The model could be embodied as a position tracking filter such as a Kalman filter, so that a new camera pose is extrapolated from the recent history of changes in the camera pose. In another example, the model could alternatively or in addition make use of sensor data such as gyroscopic or accelerometer data indicating changes to the physical position and orientation in space of the device on which the camera is mounted (e.g. an HMD comprising one or more inertial sensors). However, at a very basic level, the new camera pose could be estimated simply to be the same as the camera pose derived in respect of a preceding captured image.

At a step 434, the landmark points of the map data are projected into corresponding positions in the newly acquired image based on the initial estimate of the camera pose. This gives an image position for a landmark point of the map in the newly captured image (or a subset of the landmark points under consideration), where the image position for the landmark point corresponds to where the landmark point is expected to be seen in the newly captured image. At a step 436, the system searches the newly captured image for image features corresponding to the landmark points. To do this, a search can be carried out for image features which relate to or correlate with the landmark point. The search can be carried out at the exact predicted position, but also at a range of positions near to the predicted position. Finally, at a step 438 the estimated camera pose for that image is updated according to the actual detected positions of the landmarks in the captured image.

FIG. 6 is a schematic flowchart of a basic initialisation technique (corresponding to the step 410 discussed above), comprising, at a step 412, capturing a plurality of images of a scene from different viewpoints and, at a step 414, generating a map using each of the feature points detected from the captured images as a respective landmark point. The camera may be configured to capture images at a predetermined frame rate, or in some cases image capture may be instructed by a user providing a user input at a respective time to capture an image. As such, feature points for a plurality of different viewpoints can be detected and a map can be generated comprising a plurality of landmark points, in which each landmark point included in the generated map corresponds to a respective detected feature point, and in which each landmark point included in the map is associated with three-dimensional position information and image information for the detected feature point. Known Structure from Motion (SfM) techniques may be used for creating such a map data set. Optionally, the image capturing device may comprise one or more inertial sensors such as a gyroscope, magnetometer and/or accelerometer for tracking changes in positon and/or orientation and information from one or more such sensors can also be used for creating the map data set. The above description provides an overview of a typically technique for generating a map for an environment using detected feature points.

In any event, the above is an example of a SLAM technique for mapping a real-world environment and tracking a camera viewpoint within it. However, any suitable SLAM implementation may be considered.

Figures 7, 8:
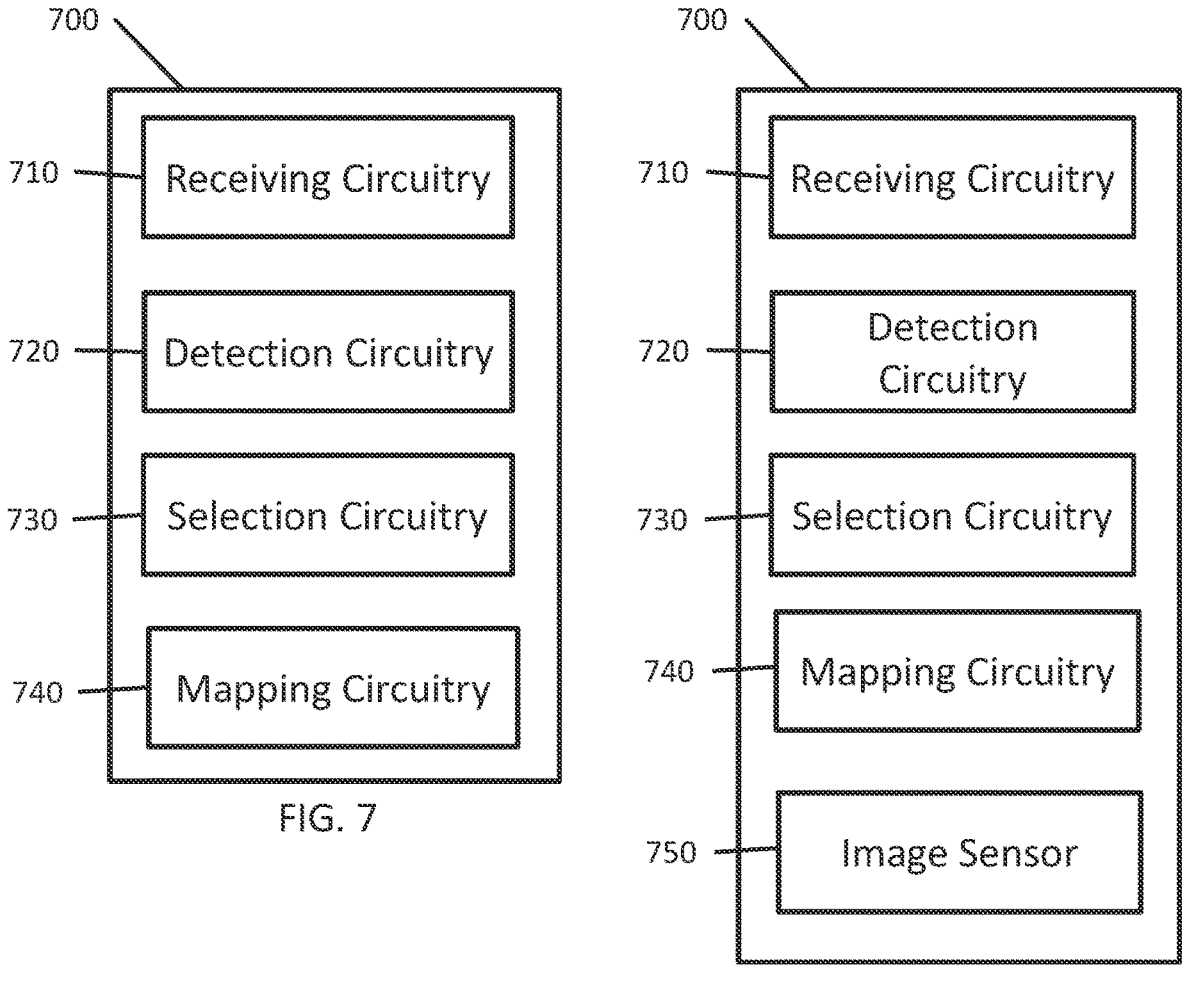
FIGS. 7 and 8 schematically illustrate respective data processing apparatuses.

FIG. 7 illustrates a data processing apparatus 700 in accordance with embodiments of the disclosure. In embodiments of the disclosure, the data processing apparatus 700 comprises: receiving circuitry 710 to receive a plurality of images of a real world environment captured from respective different viewpoints; detection circuitry 720 to detect a plurality of feature points in the plurality of captured images and to associate image information with each detected feature point indicative of an image property for a detected feature point, wherein each detected feature point represents a candidate landmark point for mapping the environment; selection circuitry 730 to select one or more of the plurality of candidate landmark points, the one or more selected landmark points corresponding to a subset of the plurality of candidate landmark points; and mapping circuitry 740 to generate, for the environment, a map comprising one or more of the selected landmark points, wherein each landmark point included in the map is defined by a three dimensional position and the associated image information for that landmark point.

The receiving circuitry 710 is configured to receive a plurality of images captured for a given environment, in which the plurality of images include a plurality of respective different viewpoints for the environment. The plurality of images may be captured by a same image sensor (one image sensor) whilst the image sensor is moved with respect to the environment. Alternatively, the plurality of images may be captured by a plurality of image sensors each having respective different viewpoints for the environment, or a combination of the two. In some cases, the plurality of image sensors may be provided as part of a same mobile device, such as the HMD 20 or a robotic device, so that each of the plurality of image sensors captures a plurality of images of an environment from a plurality of respective viewpoints as the mobile device is moved with respect to the surrounding environment. Hence more generally, the receiving circuitry 710 receives the plurality of images captured by one or more image sensors providing a plurality of respective different viewpoints for the environment. The receiving circuitry 710 can receive the plurality of images via a wired or wireless communication (e. g. WiFi® or Bluetooth®). In some examples, the receiving circuitry 710 is provided as part of a processing device such as a games console (e.g. Sony® PlayStation5®) and receives the plurality of images from a handheld controller or an HMD via a wired or wireless communication.

Referring now to FIG. 8, in embodiments of the disclosure the data processing apparatus 700 further comprises at least one image sensor 750 configured to capture a plurality of images of the environment from respective different viewpoints and the receiving circuitry 710 is configured to acquire the plurality of captured images for analysis by the detection circuitry 720. The data processing apparatus as shown in FIG. 8 may for example be a mobile apparatus such as an HMD apparatus 20 or a robotic device comprising one or more of the image sensors 750 each providing a different viewpoint. For example, in the case of an HMD, the plurality of images can be captured using one or more front-facing cameras mounted on the HMD 20 and processing for mapping the environment can be performed locally at the mobile apparatus.

Referring again to FIG. 7, the apparatus 700 comprises detection circuitry 720 to detect a plurality of feature points in the plurality of captured images obtained by the receiving circuitry 710. The detection circuitry 720 performs one or more image processing operations for at least some of a captured image of the environment to extract one or more feature points from the captured image. Salient features within the captured images including structures such as points, edges, and corners can be detected and one or more feature points can thus be extracted for one or more image features in the image. For example, an edge of a wall can be detected in a captured image and one or more feature points can be associated with the edge. The detection circuitry 720 may use any suitable corner detection algorithm or similar for detecting feature points in a captured image. Examples of suitable corner detection algorithms include FAST (Features from Accelerated Segment Test) and the Harris corner detection algorithm.

Alternatively or in addition, one or more predetermined markers (e.g. AR markers and/or QR codes and/or LEDs) may have been placed within the environment which can similarly be detected in a captured image by the detection circuitry 720. The detection circuitry 720 can thus be configured to detect a feature point corresponding to a predetermined marker in a given captured image. The use of predetermined markers is optional and is discussed in more detail later.

Hence, for a given image of the plurality of captured images received by the receiving circuitry 710, the detection circuitry 720 analyses at least some of the given image using one or more feature detection algorithms to detect one or more feature points in the captured image, in which a detected feature point corresponds to either a point for an object in the environment or a point for a predetermined marker in the environment.

The detection circuitry 720 thus detects feature points in the environment on the basis of the plurality of captured images, and generates a data set (also referred to herein as a candidate data set) comprising a plurality of detected feature points for the environment, in which each detected feature point is associated with image information indicative of an image property for the detected feature point. The image property associated with a detected feature point (candidate landmark point) can be compared with an image property in another image (such as a newly captured image that is captured once the map of the environment has been generated) so as to detect when the detected feature point is included in another image captured from another viewpoint. In some examples, the image information may comprise an image patch extracted from a captured image such that the image patch comprises a small area of image data (small relative to the size of the whole image) which can be used as a reference for detecting when the detected feature point is included in another image (e.g. small area of pixel data). The image information is thus indicative of an image property for the detected feature point so that information regarding a visual appearance as viewed in the captured image can be used for reference when later identifying a subsequent detection of that same feature point in another image.

The plurality of detected feature points for the environment thus represent a plurality of candidate feature points that can potentially each be used as landmark points for the environment for the purpose of mapping the environment. Hence, each detected feature point represents a candidate landmark point for mapping the environment. Techniques to be discussed below relate to using the set of candidate landmark points output by the detection circuitry 720 so as to select a subset of the candidate landmark points for use in generating a map for the environment so that a more reliable map is generated for the environment using a selection of the candidate landmark points and processing efficiency for generating a map for the environment is improved. Further variant techniques discussed later herein relate to using the set of candidate landmark points output by the detection circuitry 720 so as to select a subset of the candidate landmark points for use in tracking or updating high priority features of the environment more frequently than those in the subset used for the base map.

Using the set of feature points detected by the detection circuitry 720, in which each feature point represents a candidate landmark point for mapping the environment, the selection circuitry 730 is configured to select one or more of the candidate landmark points so that the selected landmark points correspond to a subset (a portion) of the total candidate landmark points available for the environment. For example, using the captured images received by the receiving circuitry 710, the detection circuitry 720 may output a candidate data set comprising N respective candidate landmark points each having associated image information indicative of at least one image property for the candidate landmark point, and the selection circuitry 730 is configured to select M of the candidate landmark points so that just (or some of) the M selected landmark points are used for generating the map for the environment, where N an M are integers and N is greater than M.

The selection circuitry 730 is configured to perform a selection from the plurality of candidate landmark points in dependence upon at least one of the image information associated with the plurality of candidate landmark points and a user input with respect to the plurality of candidate landmark points to thereby select a subset of the plurality of candidate landmarks for use in generating a map. Techniques for selecting a subset of the candidate landmark points will be discussed in more detail below and some embodiments include the use of machine learning for this selection.

In some embodiments of the disclosure, the data processing apparatus 700 comprises a user input unit (not shown in FIG. 7 or 8) for receiving one or more user inputs. Techniques in which the selection circuitry 730 and/or the detection circuitry 720 perform one or more processing operations responsive to a user input received by the user input unit are discussed in more detail later. One or more user inputs can be provided to specify one or more areas of one or more of the captured images of the environment for which processing for extracting feature points is not to be performed, and/or one or more user inputs can be provided to specify one or more of the candidate landmark points (which have been detected) so as to specify one or more candidate landmark points which are to be prevented from being selected by the selection circuitry 730, or to specify one or more objects within the images associated with one or more candidate landmark points. In some examples, alternatively or in addition to a user input specifying an area of a given captured image that is to be excluded from processing for detecting feature points representing candidate landmark points, computer vision techniques can be applied to a given captured image to detect one or more areas of the given captured image to be excluded from processing for detecting feature points representing candidate landmark points. This is discussed in more detail later.

The mapping circuitry 740 is configured to generate a map for the environment, in which the map comprises one or more of the landmark points selected by the selection circuitry 730, wherein each landmark point included in the map is defined by a three dimensional position and the associated image information for that landmark point (i.e. a the map is generated to include a selected landmark point, and the selected landmark point is defined by a 3D position information as well as the image information obtained by the detection circuitry 720 for that landmark point when obtaining the plurality of candidate landmark points for the captured images). In this way, a map comprising a set of landmark points each defined by a three dimensional spatial position and image information associated with that three dimensional position is generated, and the map is reliably generated using the subset of landmark points that have been selected by the selection circuitry 720. A subsequently captured image of the environment including one or more of the landmark points provided in the map and viewed from an initially unknown viewpoint can thus be used together with the map to calculate a position and orientation of the viewpoint associated with the subsequently captured image to thereby track an image capturing device in the environment.

The generated map includes a plurality of landmarks that have been selected by the selection circuitry 730. Each of the landmarks is defined by a three dimensional (3D) position in space and image information (such as an extracted image patch) indicating one or more visual properties of that landmark, for example as viewed in a captured image from which that landmark was identified. The mapping circuitry 740 is thus configured to generate the map and to either store the map for use in tracking one or more image sensors in the environment or output the map for use by another device. For example, the map may be generated by a device that receives the plurality of images and once generated the map can be communicated to a portable device located in the environment. In this way, processing for generating the map can be performed by a device such as a remote server or a games console, and the map can then be output to a portable device, such as an HMD or robotic device, for performing processing for tracking locally at the portable device using the generated map.

In embodiments of the disclosure, the mapping circuitry 740 is configured to obtain another image of the environment captured from another viewpoint and to calculate a position and orientation of the another viewpoint with respect to the environment in dependence upon the map for the environment and one or more of the landmark points included in the another image. The map comprising the set of landmark points each defined by a three dimensional spatial position and image information associated with that three dimensional position can be evaluated with respect to a captured image for allowing a position and orientation of a viewpoint to be calculated for the captured image. The mapping circuitry 740 firstly estimates a position and orientation of the viewpoint in respect of the newly acquired image. The mapping circuitry 740 can obtain an estimate for the position and orientation of the viewpoint in a number of ways. In some examples, a positon and orientation of the viewpoint may be estimated by extrapolating from the recent history of changes in the camera pose calculated by the mapping circuitry 740. For example, the mapping circuitry 740 may receive a sequence of successive images captured by an image sensor and calculate a viewpoint for each image in the sequence, and a viewpoint for a next image in the sequence may be initially estimated by extrapolating the previously calculated viewpoints for some of the previous images in the sequence. In some examples, the viewpoint for the newly captured image can be estimated simply to be the same as the viewpoint derived in respect of the preceding captured image in the sequence of images. In other examples in which the image capturing device comprises one or more inertial sensors, sensor data can be used by the mapping circuitry 740 for estimating a viewpoint for the newly captured image.

Based on the initial estimate of the position and orientation for the viewpoint, the mapping circuitry 740 projects one or more of the landmarks included in the map of the environment into corresponding positions in the another image in dependence upon the 3D position information for one or more landmark points of the map, so as to obtain an image position for at least one landmark in the another image. This gives at least one image position for at least one landmark (or a subset of landmarks under consideration) of where the landmark is expected to be present in the another image. The mapping circuitry 740 then searches that image position (and optionally a small surrounding area when required) to detect whether there is a match for the image information corresponding to the projected landmark. Finally, the mapping circuitry 740 calculates the position and orientation for the viewpoint of the another image in dependence upon the detected position of the at least one landmark in the another image.

As explained above, embodiments of the disclosure optionally include the use of machine learning for selecting the landmark points to be used in the processing for generating the map of the environment. In other embodiments, computer vision techniques that do not employ the use of machine learning may be used for selecting the landmark points.

As will be described later herein, in either case such computer vision techniques may also be used to determine not just which candidate landmark features to use for stable mapping but alternatively or in addition which features to re-map or update on a more regular basis.

In embodiments of the disclosure, the image information is indicative of a size of an object detected in a captured image, and the selection circuitry 730 is configured to select a candidate landmark point in dependence upon the size of the object indicated by the image information for that candidate landmark point. The detection circuitry 720 can be configured to detect one or more objects included in a given captured image. One or more blob detection algorithms and/or one or more a corner detection algorithms may be used for detecting an object in an image. Image properties such as colour and brightness can be used to define boundaries for respective regions in the captured image so as to detect a plurality of respective objects. Alternatively, or in addition, machine learning image recognition techniques may be used to detect one or more objects in an image.

Hence, as well as detecting one or more feature points, one or more objects can be detected in an image. The detection circuitry 720 can thus detect a feature point and associate image information with a detected feature point indicative of a size of an object associated with the detected feature point. For example, in the case of a table in an image, the detection circuitry 720 may detect four feature points corresponding to the four corners of the table and also detect the region corresponding to the table based on colour segmentation. The detection circuitry 720 can thus associate image information with each of the four feature points to indicate a size of the object associated with these feature points. The size for an object may be indicated in units of distance, such as a distance associated with a longest axis for the object or indicated in units of area (e.g. cm$^2$) according to an area occupied by the object in the image.

Therefore, the detection circuitry 720 can be configured to output the candidate data set, in which this candidate data set comprises a plurality of candidate landmark points (each corresponding to a respective detected feature point) each having associated image information indicative of a size of an object corresponding to that candidate landmark point. Based on the image information, the selection circuitry 720 can select a subset of the plurality of candidate landmark points so that candidate landmark points selected for inclusion in the map are selectively chosen according to object size. In some examples, the selection circuitry 720 is configured to select a candidate landmark point in dependence upon whether the size of the object indicated by the image information for that candidate landmark point is greater than a threshold size so that only a landmark point corresponding to an object having at least a threshold size is selected for use in the processing for generating the map.

A size of an object is often correlated with the object's mobility in that the larger an object is the more likely it is that the object is fixed in place or will at least remain stationary over a period of time, whereas the smaller an object is the easier it is for that object to be moved and thus the more likely it is to be moved. As such, an object's likelihood of remaining stationary can be inferred based on a size of the object. By selecting candidate landmark points based on object size, the landmark points corresponding to large objects can be selected for inclusion in the map whilst landmark points corresponding to small objects can be inhibited from being selected. In this way, landmark points corresponding to large objects and thus having a higher likelihood of corresponding to an object that will remain stationary can be used for generating the map, and landmark points having a higher likelihood of moving can be restricted from being used in the map. In contrast to this, existing SLAM-based techniques typically generate a map that can include non-stationary landmarks which can result in failure of tracking in the case where the 3D position of the landmark changes during use.

Whilst large items may optionally be preferentially used in this way for SLAM mapping due to their predictably location, as will be described later herein conversely small items (and optionally specific small items or items in specific locations) may be re-scanned more frequently precisely because they are more likely to be moved; whilst these items may not be used for mapping, an awareness of their location may be valuable to the system, if only to relay this information to the user.

In embodiments of the disclosure, the selection circuitry 720 is configured to select a candidate landmark point in dependence upon first classification data associated with the candidate landmark point, wherein the first classification data is output by a machine learning model trained to classify objects based on object mobility. The first classification data associated with a candidate landmark point is indicative of a mobility classification for the candidate landmark point from a plurality of mobility classifications such that the first classification data provides an indication of a level of mobility for the landmark point as predicted by the machine learning model. The machine learning model is trained to classify respective objects according to their degree of mobility and to output first classification data indicative of a mobility classification for a given object. The machine learning model may be trained using labelled training data comprising image frames for which certain types of object are labelled as mobile and other types of object are labelled as static. For example, objects such as humans, household pets, books, drinking vessels, doors, game controllers, chairs and stationery equipment can be given a first label whereas objects such as tables, walls, book cases, wall mounted frames, wall mounted speakers and lamps can be given a second label.

The machine learning model can thus be trained to learn a mobility classification for respective types of objects so as to classify a given type of object as either mobile or static according to a binary classification using such labelled training data. Similarly, the labelled training data may instead comprise a plurality of labels in which a first label is used for objects that have a high degree of mobility, such as humans and pets, and a second label is used for intermediate objects that have an intermediate degree of mobility, such as drinking vessels and chairs, and a third label is used for objects that have a low degree of mobility, such as walls and book cases. The machine learning model can thus be trained to learn to classify objects using a multi-class classification. It will be appreciated that whilst the above example has been described using three respective label types, two or more respective label types can be used according to how many classifications are desired. Hence more generally, the machine learning model can be trained to learn to classify different types of object included in one or more images based on object mobility and to output first classification data for one or more objects included in an image provided as an input to the machine learning model.

Hence in this case for example at least a subset of landmark points on one or more low-mobility objects may be used for SLAM mapping, whilst at least a subset of those for one or more high mobility objects may be tracked more regularly to maintain information about their location. Meanwhile intermediate objects may be re-scanned periodically or on an event basis, for example after the game has been paused and resumed (during which time for example the user may have got up, and so moved a chair).

Alternatively, another technique for training the machine learning model may use training data comprising sets of images captured for a plurality of different indoor environments. The machine learning model can be trained using a first set of images for a respective environment to learn one or more types of object that change position and/or orientation within the first set of images and one or more types of object for which there is no change in position and orientation. For example, for a set of images captured for a given environment over a time period of X minutes, objects such as humans, pets, game controllers, chairs and drinking vessels can be identified as moving during this time period, whereas objects such as tables, walls and bookcases can be identified as remaining static throughout. Consequently, using sets of images captured for different indoor environments, the machine learning model can be trained to learn one or more types of object with a high degree of mobility and one or more types of object with a low degree of mobility. For larger training data sets it will be appreciated that the training of the machine learning model can be enhanced to learn types of objects with different levels of relative mobility such that a multi-class classification of objects according to their different levels of mobility can be learnt.

Hence more generally, the machine learning model can be trained to receive an input comprising an image of an environment and to output the first classification data for one or more objects included in the image, in which the first classification data is indicative of a degree of mobility for the one or more objects. A detected feature point associated with an object in the image for which the first classification data has been output by the machine learning model can thus be associated with the first classification data. In the case where a plurality of feature points are detected by the detection circuitry 720 for a same object in an image (e.g. detecting four corner points for a table), then each of the feature points is associated with the first classification data output by the machine learning model for that object.

Consequently, the machine learning model can be trained to output the first classification data which can be associated by the detection circuitry 720 with each of the candidate landmark points identified by the detection circuitry 720, and the detection circuitry 720 can be configured to output the candidate data set for the plurality of images received by the receiving circuitry 710, in which the candidate data set comprises a plurality of candidate landmark points each having associated image information for visually identifying that landmark point and associated first classification data indicative of a level of mobility for the landmark point as predicted by the machine learning model. The candidate data set is thus received by the selection circuitry 730 so that a subset of the candidate landmark points can be selected based on the first classification data to thereby select landmark points having a classification indicative of a low degree of mobility whilst inhibiting selection of landmark points having a classification indicative of a high degree of mobility.

As will be described later herein, alternatively or in addition, at least a subset of the landmark points having a classification indicative of a high degree of mobility may be separately selected for tracking of the associated object, not necessarily for SLAM but for object awareness for the system (for example to import an object position into a virtual environment, for example to indicate it to a user wearing an HMD).

Meanwhile, the subset of landmark points selected for use in generating the map for the environment can therefore be selected to preferentially include landmark points for which there is a low likelihood of movement so that the map can be generated with improved reliability. In addition, processing efficiency associated with generating a map including landmark points is improved by using a subset of landmark points rather than each of the candidate landmark points identified by the detection circuitry 720. Similarly, processing efficiency can improved by virtue of generating or updating the map for those points less frequently, on the basis that they are unlikely to move in a given session.

Moreover, SLAM techniques can be performed using the map and problems that can arise due to movement of a landmark point after the map has been generated, thereby resulting potential loss of tracking, can be overcome. Processing for tracking using SLAM can therefore be performed using landmark points with a higher reliability and with improved processing efficiency by allowing processing for SLAM to be performed using a selection of feature points available for an environment.

In embodiments of the disclosure, the first classification data associated with a candidate landmark point comprises a classification from a plurality of classifications corresponding to respective levels of object mobility. As explained above, the machine learning model can be trained to receive a captured image of an environment and output the first classification data in dependence upon one or more object types included in the captured image. The detection circuitry 720 can thus be configured to output the candidate data set for the plurality of images received by the receiving circuitry 710, in which the candidate data set comprises a plurality of candidate landmark points having associated first classification data. The plurality of candidate landmark points may thus include a first candidate landmark point for which the associated first classification data is indicative of a first mobility classification and a second candidate landmark point for which the associated first classification data is indicative of a second mobility classification, in which the first mobility classification has a different level of mobility to the second mobility classification. The number of mobility classifications is not particularly limited and in some cases the first classification data associated with a candidate landmark point may comprise a classification from two mobility classifications, three mobility classifications or four mobility classifications and so on, in which each mobility classification corresponds to a different level of mobility.

In embodiments of the disclosure, the first classification data associated with a candidate landmark point comprises a classification from a plurality of classifications, and the plurality of classifications comprises a first mobility classification and a second mobility classification, wherein the first mobility classification corresponds to a static classification and the second mobility classification corresponds to a mobile classification. The first classification data can be used to distinguish the respective candidate landmark points identified by the detection circuitry 720 according to a binary classification of "mobile" or "static". Therefore, with reference to the first classification data, the selection circuitry 730 can reliably select a subset of the candidate landmark points indicated as having a static classification. Therefore, in embodiments of the disclosure, the selection circuitry 730 is configured to select a candidate landmark point for which the associated first object classification data indicates that the candidate landmark point corresponds to an object having a static classification. Consequently, a subset of the candidate landmark points can be chosen by deliberately not selecting landmark points indicated as having a mobile classification.

In other embodiments of the disclosure, the plurality of classifications comprises more than two mobility classifications, such as a first, second and third mobility classification. In this case, the first mobility classification is indicative of a static classification, the second mobility classification is indicative of an intermediate (intermediate mobility) classification and the third mobility classification is indicative of a high mobility classification. For example, the intermediate classification may correspond to types of object which are capable of movement but for which movement is less likely (such as a drinking vessel or a chair), whereas the high mobility classification may correspond to types of object which are capable of movement and for which movement is more likely (such as humans or pets). It will be appreciated that a larger number of respective mobility classifications may similarly be provided to provide a more granular classification. The use of more than two mobility classifications may be beneficial in circumstances in which the environment observed in the plurality of captured images comprises a relatively small number of detected feature points and thus a relatively small number of candidate landmark points. In particular, for an environment comprising a small number of candidate landmark points, and thus potentially a small number of candidate landmark points having a static classification, the selection circuitry 720 can be configured to select a subset of the candidate landmark points for the environment by selecting each of the candidate landmark points associated with a static classification and at least some of the candidate landmark points associated with the intermediate classification, whilst not selecting any of the landmark points associated with the high mobility classification. Conversely, for an environment comprising a large number of candidate landmark points, then the selection circuitry 730 may instead select only from the candidate landmark points associated with a static classification.

In some examples, the selection circuitry 730 may be configured to select the subset of landmark points by selecting at least a threshold number of the plurality of candidate landmark points identified by the detection circuitry 720. Therefore, for an environment comprising a small number of candidate landmark points, and thus potentially a small number of candidate landmark points having a static classification, the selection circuitry 730 can firstly select each of the candidate landmark points having the static classification and then select from the candidate landmark points having the intermediate classification to thereby select at least the threshold number of landmark points. For example, the selection circuitry 730 may randomly select from the candidate landmark points having the intermediate classification to thereby select at least the threshold number of landmark points. Alternatively, rather than using three mobility classifications as described above, a larger number of mobility classifications may be used, and the selection circuitry 730 can be configured to select at least a threshold number of the plurality of candidate landmark points by firstly selecting candidate landmark points having the first classification, then selecting candidate landmark points having the second classification and so on until reaching a threshold number of landmark points. Hence more generally, in some examples the first classification data comprises a plurality of classifications corresponding to respective levels of object mobility, and the selection circuitry is configured to select a subset of the plurality of candidate landmark points in dependence upon an order of priority, in which candidate landmark points having a first mobility classification have a higher priority than candidate landmark points having a second mobility classification.

In embodiments of the disclosure, the selection circuitry 730 is configured to select a candidate landmark point in dependence upon the first classification data associated with the candidate landmark point, wherein the first classification data is output by the machine learning model trained to classify objects based on object mobility, wherein the selection circuitry 730 is configured to remove at least one landmark point from the selected landmark points in dependence upon a user input with respect to the selected landmark points, and the mapping circuitry 740 is configured to update the map for the environment.

The subset of the candidate landmark points selected on the basis of the first classification data comprises landmark points associated with objects having either a static classification, or at least a low mobility classification, such that the map can be generated using landmark points with a high likelihood of remaining stationary during tracking. However, even some static features can still be problematic for SLAM based techniques. Features such as mirrors, glass panels (e.g. windows, doors) and display screens can have an appearance that varies depending upon a position and/or orientation from which the feature is observed due to reflections. This can be problematic in that using a feature point corresponding to such an object as a landmark point can mean that the image information associated with the landmark point may not be able to identify the landmark point when observed in a newly captured image taken from a different viewpoint due to the different appearance, thereby potentially resulting in disruption of tracking. Consequently, the selection circuitry 730 can be configured to remove at least one landmark point from the selected landmark points based on a user input with respect to the landmark points that have been selected by the selection circuitry 730. The user input can be received from a user input device such as a handheld controller for allowing the user to select one or more individual landmark points from the selected landmark points.

Selection of a landmark point to remove that landmark point from the landmark points can be achieved based on a user input either with respect to a list comprising the landmark points selected by the selection circuitry 730 or with respect to a graphical representation of the map generated by the mapping circuitry 740.

In some embodiments, the data processing apparatus 700 comprises processing circuitry to generate a graphical representation of the map generated by the mapping circuitry 740 for display. The processing circuitry can thus output image data indicative of a graphical representation of at least a part of the generated map for display to a user via a display unit. For example, in the case of a user wearing an HMD, the output circuitry is configured to output the generated image data to the HMD for display to the user wearing the HMD. Similarly, in the case where the receiving circuitry 710 receives images captured by one or more image sensors mounted on another portable entertainment device such as the Sony® PlayStation Vita® (PSV), the processing circuitry can output the generated image data for display by a display device such as a monitor or a television. Hence more generally, a graphical representation of at least part of the map generated by the mapping circuitry 740 can be output for display to a user, such that the graphical representation includes a visual representation of at least some of the landmark points relative to the environment, and a user input corresponding to a selection of a landmark point included in the map can be received for removing that landmark point. The mapping circuitry 740 thus updates the map to remove at least one landmark point selected for removal by a user. In this way, a user can manually select landmark points corresponding to problematic objects such as mirrors, glass panels and display screens to thereby remove these features from the map and the map can be updated accordingly by the mapping circuitry 740.

In embodiments of the disclosure, the detection circuitry 720 is configured to detect one or more predetermined markers in the plurality of captured images as one or more of the detected feature points such that a detected predetermined marker corresponds to a respective candidate landmark point. One or more predetermined markers can be placed in an environment for use in generating a mapping for the environment. For example, for particularly problematic environments comprising a relatively small number of features, the use of such predetermined markers can assist in providing a number of reliable points for mapping. The one or more optically detectable predetermined markers comprise at least one of a passive marker and an active marker, in which passive markers reflect incident light and active markers comprise one or more LEDs for emitting light. Examples of passive optically detectable markers which can be provided include: one or more shapes having a predetermined colour and/or one or more optically reflective markers configured to reflect light. An optically reflective marker that reflects at least one of visible light and infra-red light may be used. The detection circuitry 720 can thus be configured to detect a feature point corresponding to a predetermined marker in a given captured image.

In embodiments of the disclosure, the detection circuitry 720 is configured to associate second classification data with a candidate landmark point in dependence upon whether the candidate landmark point corresponds to a predetermined marker, and wherein the selection circuitry 720 is configured to select the candidate landmark point in dependence upon whether the second object classification data is associated with the candidate landmark point. The detection circuitry 720 can detect a predetermined marker included in a captured image, for example by detecting an image feature in a captured image that matches a reference image feature stored for a predetermined marker. In response to detecting a feature point corresponding to a predetermined marker, the detection circuitry 720 associates second classification data with the detected feature point to thereby obtain at least one candidate landmark point having associated second classification data. The selection circuitry 720 can thus select from the plurality of candidate landmark points to select candidate landmark points associated with the second classification data to thereby select landmarks corresponding to predetermined markers for generating the map. In this way, candidate landmark points corresponding to predetermined markers can be preferentially selected for generating the map for the environment. Therefore, the detection circuitry 720 can be configured to output the candidate data set for the plurality of images received by the receiving circuitry 710 in which the candidate data set comprises one or more candidate landmark points having associated image information indicative of an image property and associated second classification data, and the selection circuitry 730 can perform a selection from the candidate data set responsive to whether second classification data is associated with a candidate landmark point.

In embodiments of the present description, a SLAM system such as that described herein identifies candidate landmark points. In traditional systems, these points are tracked over a plurality of images either taken in parallel with multiple cameras from different viewpoints, and/or in series by one camera as it moves to different viewpoints, and the position of the camera and the landmark points are resolved based on the solution that provides the greatest consistency between the points in the plurality of images.

As described above, in embodiments of the present invention this basic approach can be improved upon by classifying whether a landmark point is likely to be part of a static feature in the real world environment, as this means that the real-world inputs to the above solution is more likely to remain consistent between images.

However, as described elsewhere herein this scheme can also be used (or alternatively be used) to identify features having a high mobility. These are generally not suitable for SLAM mapping and so may optionally be beneficially omitted from such a map, but are nevertheless very relevant to the user, particularly if they are wearing an HMD or other device that limits their view of the real world, or are playing for example in the dark.

Consequently the above mentioned techniques for identifying objects from image information can be used to identify objects that have high mobility, such as pets, drinking vessels and the like. Moreover, certain objects may have higher priorities than other; for example on a coffee table a hot drink may have a higher priority than a book or remote control because knocking the drink over could hurt the user or cause damage. Similarly a pet may have a high priority because it can be both a trip hazard and could also be hurt if knocked into.

Accordingly in embodiments of the present description, while the ML mentioned previously herein may optionally classify low mobility objects for the purpose of SLAM mapping, it also classifies high mobility objects.

As described previously herein, the ML may be trained to identify objects of interest, which may be defined based on the need of the user experience being served by the system (for example for a game that expects the user to sit down, the position of a pet may be less important that for a game where the user stands). The ML (or a plurality of MLs for common domestic layouts) can be trained to identify or rate high priority objects such as a coffee table or other common trip hazards; drink cans, cups, and other spill hazards; cigarettes, candles, and other fire hazards; and the like. Not all objects of interest need be hazards; for example game controllers and remote controls may be useful to identify, as may be bowls or plates.

Similarly, an object may be rated as high priority based on its inherent mobility—as well as pets, objects such as balls, toy cars and the like may be considered more likely to move or be moved than for example a book.

The location of these objects relative to the user may also contribute to whether an object is an object of interest. A cup on a shelf 3 meters from the user is not likely to be a spill hazard, whereas one on a coffee table immediately in front of the user is. Similarly objects close to the user and in front of them are more likely to be of interest than those behind them. More generally all things being equal objects in the user's apparent or potential direction of travel may be of more interest than others.

Hence more generally the system described herein may identify landmarks for objects of interest, where this is identification is based upon object size and/or type and optionally object location.

Some object types may have an inherent high priority, for example if they are classed as a potential hazard, and so be likely to become objects of interest. Similarly some objects may have inherent mobility.

Locations may be evaluated either using a semantic analysis of the objects (for example objects on a coffee table may be considered of more interest than objects on a dining table, as interaction with the objects on the coffee table may be considered more likely) and/or based on proximity to the user and/or the user's apparent or potential direction of travel.

The nature of the object and optionally its location may thus contribute to a classification of the object as being an object of interest. As noted above, this may be a classification of the ML system as part of a wider SLAM scheme that partitions candidate landmark points into likely static points for mapping, and likely mobile points that are less suitable for mapping; here the principle is extended to identify a subset of such points that are associated with objects of interest. It will be appreciated that the ML training is essentially similar, but with the additional or alternative training label of objects of interest for such objects.

It will be appreciated that such an ML can be trained in advance for a typical room layout, and/or can learn in the user's room based upon whether predicted classes of objects then behave according to expectation (for example a bed may be classified as static, but turn out to be a fold-away bed that is sometimes up or down; meanwhile an object on the coffee table may be a decorative item that is never moved).

In embodiments of the description, the ML can update its model based on the current user's interactions with objects—for example if a user frequently adjusts the volume using a remote control, then the priority of the remote control may increase. Similarly, the user may directly inform the system about certain objects, for example identifying types of pets (or stating there is no pet), or that they are a non-smoker, for example. This can remove the need to search for these objects, or reduce the scope for false positives.

In any event, objects in the room that are likely to move or be moved during a current session are thus identified by the ML as objects of interest either based on pre-existing training based on similar environments, and/or training in the current user's environment, based on candidate SLAM data.

Such objects of interest are then re-scanned regularly by the system to keep track of their location and so update the map. If using the SLAM mapping for localisation, then the system can track where such an object should now be in the current image(s), and analyse the image data only for those areas (or optionally a region around them) for the objects. In this way the objects can be efficiently tracked with a higher frequency than static objects in the environment, without placing an unnecessarily large computational burden on the system.

The tracking frequency for this purpose may depend on the object and/or on the user—for example if the user is seated, then tracking may be less frequent than if the user is standing, or may vary with proximity to the user.

More generally, the frequency with which an object is tracked may be responsive to the degree to which it is classified as an object of interest by the ML; for example a candle in close proximity to the user will generate a much stronger classification response from a trained ML than a drinks can beyond arms reach.

Hence the tracking frequency may range from each image frame, down to $\frac{1}{20}$ sec, $\frac{1}{10}$ sec, $\frac{1}{5}$ sec, $\frac{1}{2}$ sec, 1 sec, 2 secs, 4 secs, 10 secs or the like (typically quantised by the frame rate). The frequency may be based on the degree of interest or may be based on a classification of the degree of interest, for example most interest/urgent having a high frequency such as per frame or a fraction of a second, medium interest having a frequency such as 1-5 seconds, and lower interest having a frequency of 2-10 seconds or less. These frequency ranges may be scaled to be shorter or longer depending on need (for example depending on the user's activity or proximity, or the nature of the content being presented).

It will be appreciated that for the purposes of SLAM, features for static objects (i.e. landmark points) may also be tracked at a high frequency for the purposes of localisation within the map, but the objects themselves and map itself is not being updated at the high frequency, in contrast to the regions of the map comprising the objects of interest.

The tracking frequency for objects of interest may also be dependent upon computational resource; for example if a game requires a spike in resources such that tracking the current objects of interest cannot maintain a current frequency (or range of frequencies), the frequency may drop, and/or the frequency may drop, and/or drop (or drop more) for non-hazard objects first.

In embodiments of the present description, the system thus has a model of where objects of interest currently are, as well as the notional viewpoint of the user (for example if using an HMD or a mobile screen such as a PlayStation Vita® or a mobile phone, for example in an augmented reality mode).

Therefore information about one or more objects of interest can be incorporated into the user's view.

Optionally, a user may request that information about SLAM landmark points is displayed to them—in this way they can see a point based outline of their surrounding environment. It will be appreciated that image information associated with those points and optionally an area around them may also be provided so that a recognisable image of at least parts of the environment are provided. As noted above, the displayed landmark points for static objects may have been mapped less recently than those for objects of interest, as these are less likely to move.

Alternatively or in addition, changes to landmark point positions may be displayed to a user—hence if a pet moves, this movement may be shown (and typically the pet is tracked at high frequency), but then (for example if the pet re-settles) after a predetermined period the landmark points are no longer shown. This approach helps the user with awareness of objects that can move by themselves (e.g. if a door swings open, this will be visible). Optionally this approach is subject to a motion threshold or a gross motion condition (for example if a pet moves its head, this is not shown, but if the whole pet (or the pets body, or a threshold proportion of landmark points associated with a pet) moves then this is displayed, so that only significant movement is relayed to the user.

Alternatively or in addition, a user can specify objects that it would be helpful to find, such as game controllers, remote controls, and drinks. The user can then summon a display of the associated landmark points (and optionally image information) so that they can reach for (or avoid) the object even though they cannot see it directly.

Alternatively or in addition, hazards may be indicated to the user. These may be indicated either when the hazard moves or changes, and/or when the user comes within a threshold proximity of the hazard.

The location of the hazard may be indicated to the user, and optionally the nature or type of hazard (e.g. an icon such as a flame or hot drink, and/or a label indicating the object classification, and/or image data associated with the identified object.

Optionally if the user still gets closer to the hazard, or the ML classification response to the hazard continues to increase (for example because the hazard is moving or changing in some manner, such as a candle flame flickering), then the current content being displayed to the user may be paused to increase the user's attention on the hazard. If the hazard is not in the user's line of sight then an arrow or other indicator directing the user's attention to the hazard may be provided, and/or guidance on how to move away from the hazard.

Any of the above may be overlaid on the current content being displayed to the user. In the case of image data this may be overlaid with a partial transparency so that the user can see both the image data and the underlying content.

Figure 9:
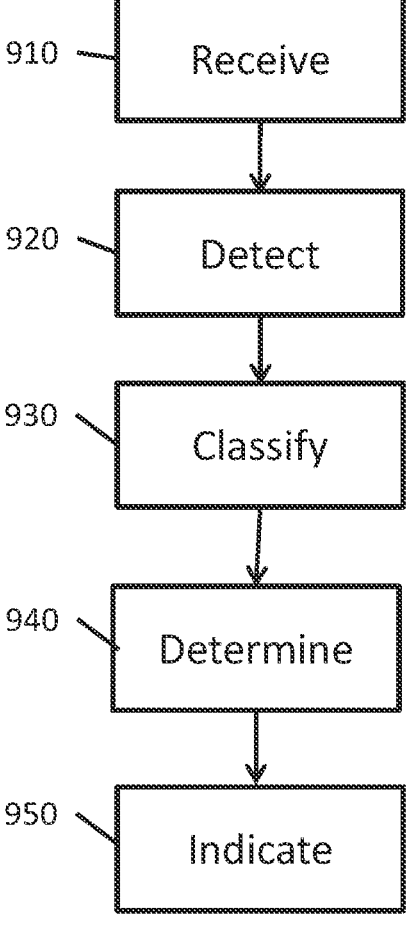
FIG. 9 is a schematic flowchart of a method of environment mapping.

Accordingly, and referring now to FIG. 9, in a summary embodiment of the present description, a method of environment mapping for a user of a virtual display (such as an HMD) comprises:

In a first step 910, receiving a plurality of images from respective different viewpoints, as described elsewhere herein;

In a second step 920, using a simultaneous localisation and mapping 'SLAM' process, detect feature points in the plurality of images, as described elsewhere herein;

In a third step 930, classifying one or more objects within the plurality of images as being objects of interest, as described elsewhere herein;

In a fourth step 940, determining the position of the or each object of interest using feature points corresponding to the objects of interest in the images, as described elsewhere herein; and In a fifth step 950, providing an indication of the position of one or more objects of interest to a user of a virtual display, as described elsewhere herein, wherein the step of determining the position of the or each object of interest using their feature points is repeated, more frequently than for other feature points in the images, as described elsewhere herein (for example, whilst static object landmark points may be tracked for localisation, the position of these points within the map, and/or the re-classification or reassessment of the points or the objects/structures they correspond to, is not updated so frequently).

In an instance of the summary embodiment, the classification step comprises classifying the one or more objects based on one or more selected from the list consisting of type of object; and size of object, as described elsewhere herein.

In an instance of the summary embodiment, the classification step comprises classifying the one or more objects into one of a plurality of classifications including a likely static classification and an object of interest classification.

In this case, optionally at least a subset of feature points corresponding to one or more objects classified as likely static are used for SLAM processing to generate a map of the environment.

In an instance of the summary embodiment the classifying step comprises estimating a degree of interest for objects of interest, the degree of interest being a function of one or more selected from the list consisting of the type of object, whether the object is a one predefined as a hazard, whether the object is a one predefined as having inherent motion, whether the object is a one predefined as being movable, and the proximity of the object to the user, as described elsewhere herein.

In an instance of the summary embodiment the classifying step comprises estimating a degree of interest for objects of interest, the degree of interest being a function of one or more selected from the list consisting of the state of the user (e.g. whether standing or sitting), the orientation of the user to the object, and the motion of the user relative to the object (e.g. whether approaching or receding), as described elsewhere herein.

In an instance of the summary embodiment the classifying step comprises estimating a degree of interest for objects of interest, the degree of interest being a function of one or more selected from the list consisting of the type of content being presented to the user (e.g. passive like a film, or active like a game), the current game input requirements (e.g. are large movements required or likely either now or imminently), and the current game inputs of the user (e.g.

gestures, or button pushes; rapid inputs may also indicate rapid other motions, making nearby objects more relevant for possible collisions), as described elsewhere herein.

In instances of the summary embodiment estimating a degree of interest, the step of determining the position of objects of interest is repeated at a higher frequency that is a function of the degree of interest (hence high interest objects may be tracked at shorter intervals than lower interest objects, and both may be tracked more frequently than static objects optionally used for SLAM mapping), as described elsewhere herein.

In instances of the summary embodiment estimating a degree of interest, the step of determining the position of objects of interest is repeated at a higher frequency that is a function of whether the object is classified as a hazard, as described elsewhere herein.

In instances of the summary embodiment estimating a degree of interest, the step of determining the position of objects of interest is repeated at a higher frequency that is a function of available computational resources unallocated to a primary application (e.g. a game), as described elsewhere herein.

In instances of the summary embodiment estimating a degree of interest, the step of providing an indication to the user comprises displaying the indication if the degree of interest in an object exceeds a threshold amount, as described elsewhere herein. Alternatively or in addition, the indication may be provided if an object is classified as a hazard, optionally in conjunction with proximity. It will be appreciated that this combination would generate a high degree of interest in the ML output.

In instances of the summary embodiment, the step of providing an indication to the user comprises displaying one or more selected from the list consisting of a point cloud of feature points comprising at least a subset of feature point corresponding to at least a first object of interest, image data for a captured image region corresponding to at least a first object of interest, and an icon classifying a respective at least first object of interest, as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Figure 10:
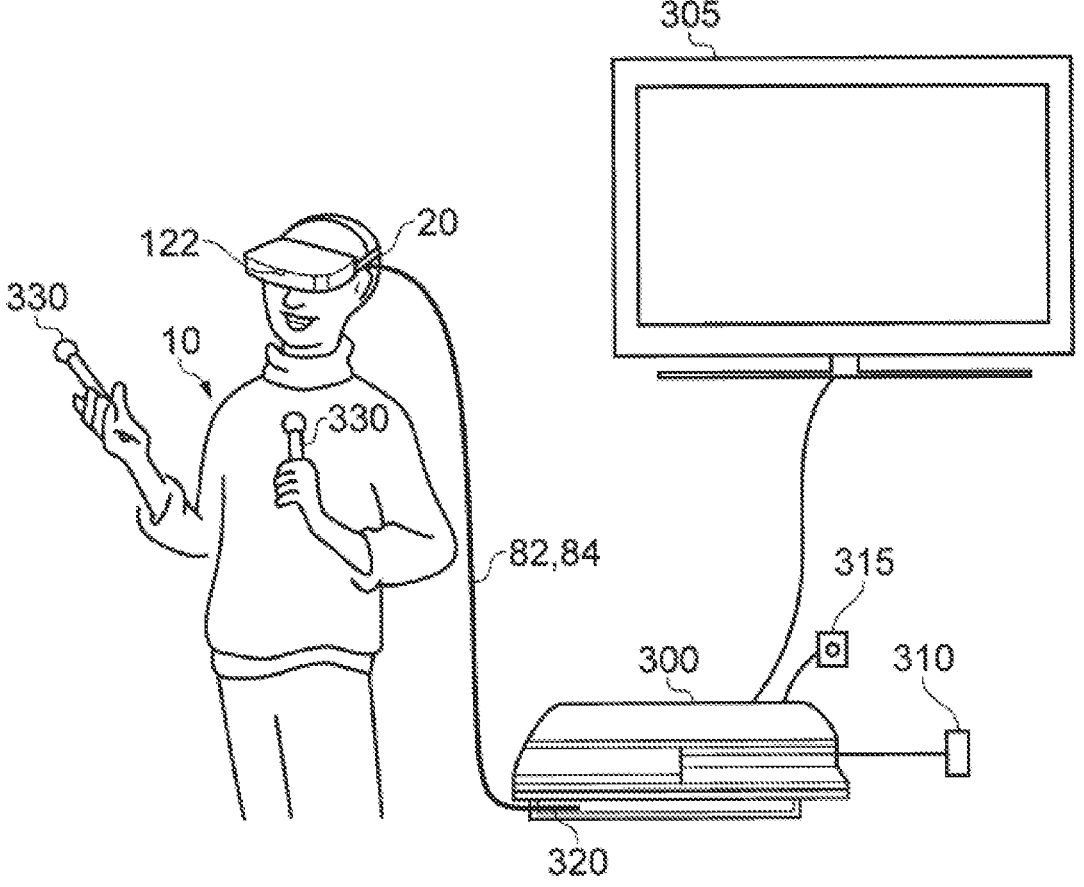
FIG. 10 schematically illustrates a user wearing an HMD connected to a games console.

As an example of conventional hardware, FIG. 10 schematically illustrates an example virtual reality system and in particular shows a user wearing the HMD 20 connected to a games console 300 such as the Sony PlayStation 5® via an input 320. The games console 300 is connected to a mains power supply 310 and to a display device 305. One or more cables 82, 84 may optionally link the HMD 20 to the games console 300 or the HMD 20 may communicate with the games console via a wireless communication.

The video displays in the HMD 20 are arranged to display images generated by the games console 300, and the ear-pieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from an image sensor 122 mounted on the HMD 20 can optionally be passed back to the games console 300 via one or more of the cables 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 may also provide power to the HMD 20, according to the USB standard.

FIG. 10 also shows the separate display device 305 such as a television or other openly viewable display (by which it is meant that viewers other than the HMD wearer may see images displayed by the display 305) and an image sensor 315, which may be (for example) directed towards the user (such as the HMD wearer) during operation of the apparatus. An example of a suitable image sensor is the PlayStation® Eye camera, although more generally a generic "webcam", connected to the console 300 by a wired (such as a USB) or wireless (such as Wi-Fi® or Bluetooth®) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see a virtual environment (or a subset, version or representation of it) as seen by the HMD wearer. In other examples, the social screen could display other material such as information relating to the HMD wearer's current progress through an ongoing computer game. For example, the HMD wearer could see a virtual environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

In FIG. 10 the user is also shown holding a pair of hand-held controllers 330 which may be, for example, Sony® Move® controllers which communicate wirelessly with the games console 300 to control (or to contribute to the control of) game operations relating to a currently executed game program.

Accordingly, in a summary embodiment of the present description, an environment mapping system (such as a games console) comprises an input (e.g. input 320) config-ured to receive a plurality of images from respective differ-ent viewpoints (e.g. from HMD mounted image sensor 122 and/or image sensor 315); a simultaneous localisation and mapping 'SLAM' processor (e.g. a CPU of the games console, not shown), configured (e.g. by suitable software instruction) to detect feature points in the plurality of images using SLAM; a classification processor (e.g. a CPU of the games console, not shown) configured (e.g. by suitable software instruction) to classify one or more objects within the plurality of images as being objects of interest; a positioning processor (e.g. a CPU of the games console, not shown) configured (e.g. by suitable software instruction) to determine the position of the or each object of interest using feature points corresponding to the objects of interest in the images; and an output processor (e.g. a CPU of the games console, not shown) configured (e.g. by suitable software instruction) to provide an indication of the position of one or more objects of interest to a user of a virtual display; and wherein the positioning processor is configured to repeatedly determine the position of the or each object of interest using their feature points, more frequently than for other feature points in the images.

It will be apparent to a person skilled in the art that variations in the above system corresponding to the various embodiments of the method as described and claimed herein are also considered within the scope of the present invention.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of environment mapping comprising:
receiving a plurality of images from different viewpoints;
using a simultaneous localisation and mapping (SLAM) process to detect feature points in the plurality of images;
detecting a plurality of objects in the plurality of images using a computer vision technique;
classifying one or more objects of the plurality of objects as objects of interest using a trained machine learning model based on object mobility, wherein classifying comprises:
determining a level of mobility for each object of the plurality of objects,
classifying each object as an object of interest or not an object of interest based on the level of mobility, and
labeling feature points associated with each object using a same classification as the object;
repeatedly determining a position of each object of the plurality of objects using a set of feature points associated with the object, wherein determining a position of an object classified as the object of interest is repeated more frequently than determining a position of an object classified as not the object of interest; and
providing an indication of the position of at least one object of interest to a user of a virtual display based on the determination.

2. The method of claim 1, wherein classifying further comprises classifying the one or more objects into one of a plurality of classifications including a static classification.

3. The method of claim 2, further comprising
selecting a subset of feature points corresponding to the one or more objects classified in the static classification; and
using the subset of feature points in SLAM processing to generate an environmental map.

4. The method of claim 1, wherein classifying further comprises, for an object classified as the object of interest, estimating a degree of interest for the object.

5. The method of claim 4, wherein the degree of interest for the object is determined as a function of one or more of:
i. a type of the object;
ii. whether the object is predefined as a hazard;
iii. whether the object is predefined as having inherent motion;
iv. whether the object is predefined as being movable; and
v. a proximity of the object to the user.

6. The method of claim 5, wherein the frequency of determining the position of the object that is predefined as the hazard is higher than the frequency for an object that is not a predefined hazard.

7. The method of claim 4, wherein the degree of interest for the object is determined as a function of one or more of:
i. a state of the user;
ii. an orientation of the user to the object; and
iii. a motion of the user relative to the object.

8. The method of claim 4, wherein
the method is being performed within a context of a game, and
the degree of interest for the object at a given time is determined as a function of one or more of:
i. a type of game content being presented to the user at the given time;
ii. game input requirements at the given time; and
iii. game inputs of the user at the given time.

9. The method of claim 4, wherein the frequency of determining the position of the object classified as the object of interest is a function of degree of interest estimated for the object.

10. The method of claim 4, wherein the frequency of determining the position of the object is a function of available computational resources unallocated to a primary application.

11. The method of claim 4, wherein providing the indication comprises displaying the indication when the degree of interest for the object exceeds a threshold amount.

12. The method of to claim 1, wherein providing the indication comprises displaying one or more of:
i. a point cloud of the set of feature points;
ii. image data associated with the object of interest; and
iii. an icon representing the object of interest.

13. A non-transitory, computer readable storage medium containing a computer program comprising computer executable instructions adapted to cause a computer system to perform a method of environment mapping comprising:
receiving a plurality of images from different viewpoints;
using a simultaneous localisation and mapping (SLAM) process to detect feature points in the plurality of images;
detecting a plurality of objects in the plurality of images using a computer vision technique;
classifying one or more objects of the plurality of objects as objects of interest using a trained machine learning model based on object mobility, wherein classifying comprises:
determining a level of mobility for each object of the plurality of objects, classifying each object as an object of interest or not an object of interest based on the level of mobility, and labeling feature points associated with each object using a same classification as the object;

repeatedly determining a position of each object of the plurality of objects using a set of feature points associated with the object, wherein determining a position of an object classified as the object of interest is repeated more frequently than determining a position of an object classified as not the object of interest; and providing an indication of the position of at least one object of interest to a user of a virtual display based on the determination.

14. The non-transitory, computer readable storage medium of claim 13, wherein classifying further comprises, for an object classified as the object of interest, estimating a degree of interest for the object.

15. The non-transitory, computer readable storage medium of claim 14, wherein the degree of interest for the object is determined as a function of one or more of:

i. a type of the object;

ii. whether the object is predefined as a hazard;

iii. whether the object is predefined as having inherent motion;

iv. whether the object is predefined as being movable; and v. a proximity of the object to the user.

16. The non-transitory, computer readable storage medium of claim 15, wherein the frequency of determining the position of the object that is predefined as the hazard is higher than the frequency for an object that is not a predefined hazard.

17. An environment mapping system comprising:

one or more processors; and one or more computer-readable media storing instructions which, when executed by the one or more processors, cause the environment mapping system to perform operations comprising:

receiving a plurality of images from different viewpoints;

using a simultaneous localisation and mapping (SLAM) process to detect feature points in the plurality of images;

detecting a plurality of objects in the plurality of images using a computer vision technique;

classifying one or more objects of the plurality of objects as objects of interest using a trained machine learning model based on object mobility, wherein classifying comprises:

determining a level of mobility for each object of the plurality of objects, classifying each object as an object of interest or not an object of interest based on the level of mobility, and labeling feature points associated with each object using a same classification as the object;

repeatedly determining a position of each object of the plurality of objects using a set of feature points associated with the object, wherein determining a position of an object classified as the object of interest is repeated more frequently than determining a position of an object classified as not the object of interest; and providing an indication of the position of at least one object of interest to a user of a virtual display based on the determination.

18. The environment mapping system of claim 17, wherein classifying further comprises, for an object classified as the object of interest, estimating a degree of interest for the object.

19. The environment mapping system of claim 18, wherein the degree of interest for the object is determined as a function of one or more of:

i. a type of the object;

ii. whether the object is predefined as a hazard;

iii. whether the object is predefined as having inherent motion;

iv. whether the object is predefined as being movable; and v. a proximity of the object to the user.

20. The environment mapping system of claim 19, wherein the frequency of determining the position of the object that is predefined as the hazard is higher than the frequency for an object that is not a predefined hazard.

* * * * *